United States Patent [19]

Sano

[11] 4,321,661

[45] Mar. 23, 1982

[54] APPARATUS FOR CHARGING A CAPACITOR

[75] Inventor: Jun-ichi Sano, Chelmsford, Mass.

[73] Assignee: GTE Laboratories Incorporated, Waltham, Mass.

[21] Appl. No.: 219,472

[22] Filed: Dec. 23, 1980

[51] Int. Cl.³ .............................................. H02M 3/18
[52] U.S. Cl. ..................................... 363/60; 307/110; 307/246
[58] Field of Search .................................. 363/59–61; 320/1; 307/109, 110, 246, 264, 578, 581

[56] References Cited

U.S. PATENT DOCUMENTS 3,824,447  7/1974  Kuwabara ............................. 363/60
4,053,821  10/1977  Hose, Jr. et al. ..................... 363/60
4,199,806  4/1980  Patterson ............................. 363/60

Primary Examiner—William M. Shoop
Assistant Examiner—Peter S. Wong
Attorney, Agent, or Firm—David M. Keay

[57] ABSTRACT

An NMOS FET circuit for charging a storage capacitor to a voltage higher than the power supply voltage. The circuit includes several stages each including a capacitance and FET switches. In response to a high level control signal the FET's in effect connect each capacitance between the supply voltage and ground to charge the capacitances. Then, in response to a low level control signal the FET's in effect connect the capacitances in series between the supply voltage and the storage capacitor thus transferring a portion of the charges in the capacitances into the storage capacitor. The charge placed in the storage capacitor produces a voltage thereacross which is greater than the supply voltage.

10 Claims, 3 Drawing Figures

APPARATUS FOR CHARGING A CAPACITOR

BACKGROUND OF THE INVENTION

This invention relates to apparatus for charging a capacitor. More particularly, it is concerned with apparatus for charging a capacitor to a voltage higher than the available supply voltage.

Under certain circumstances, particularly with metal-oxide-silicon (MOS) integrated circuits, it would be desirable to have available voltages which are higher than the operating voltages available from the power supplies typically employed. The availability of higher voltages would be particularly useful for DC biasing in order to provide improved switching speed and greater current driving capability.

SUMMARY OF THE INVENTION

Voltages higher than the operating potential provided by the available power supply may be provided by charging a storage capacitor to a higher voltage by employing apparatus in accordance with the present invention. Apparatus in accordance with the present invention includes a source of operating potential and a point of reference potential. A plurality of stages are arranged in order. Each stage includes a capacitance means with first and second terminals, a first field effect transistor connected between the source of operating potential and the first terminal of the capacitance means, and a second field effect transistor connected between the second terminal of the capacitance means and the point of reference potential. Each stage except the last stage has a third field effect transistor which is connected between the second terminal of the capacitance means of the associated stage and the first terminal of the capacitance means of the following stage. The last stage also has a third field effect transistor which is connected between the second terminal of the capacitance means of the last stage and the source of operating potential. Means are provided for coupling the first terminal of the capacitance means of the first stage to one terminal of the storage capacitor, and means are provided for coupling the point of reference potential to the other terminal of the storage capacitor. The apparatus includes control means for applying first or second control signal conditions to the stages. In response to the first control signal condition all of the first and second field effect transistors are in a high conduction condition and the third field effect transistors are in a relatively low conduction condition whereby each of the capacitance means is connected between the source of operating potential and the point of reference potential and becomes charged. In response to the second control signal condition all of the first and second field effect transistors are in a low conduction condition and the third field effect transistors are in a relatively high conduction condition whereby the plurality of capacitance means are connected in series between the source of operating potential and the storage capacitor, thus transferring a portion of the charges in the capacitance means into the storage capacitor. The charge placed in the storage capacitor produces a voltage thereacross which is greater than the operating potential.

For a better understanding of the present invention, together with other and further objects, advantages, and capabilities thereof, reference is made to the following disclosure and appended claims in connection with the above-described drawings.

DETAILED DESCRIPTION OF THE INVENTION

Figure 1:
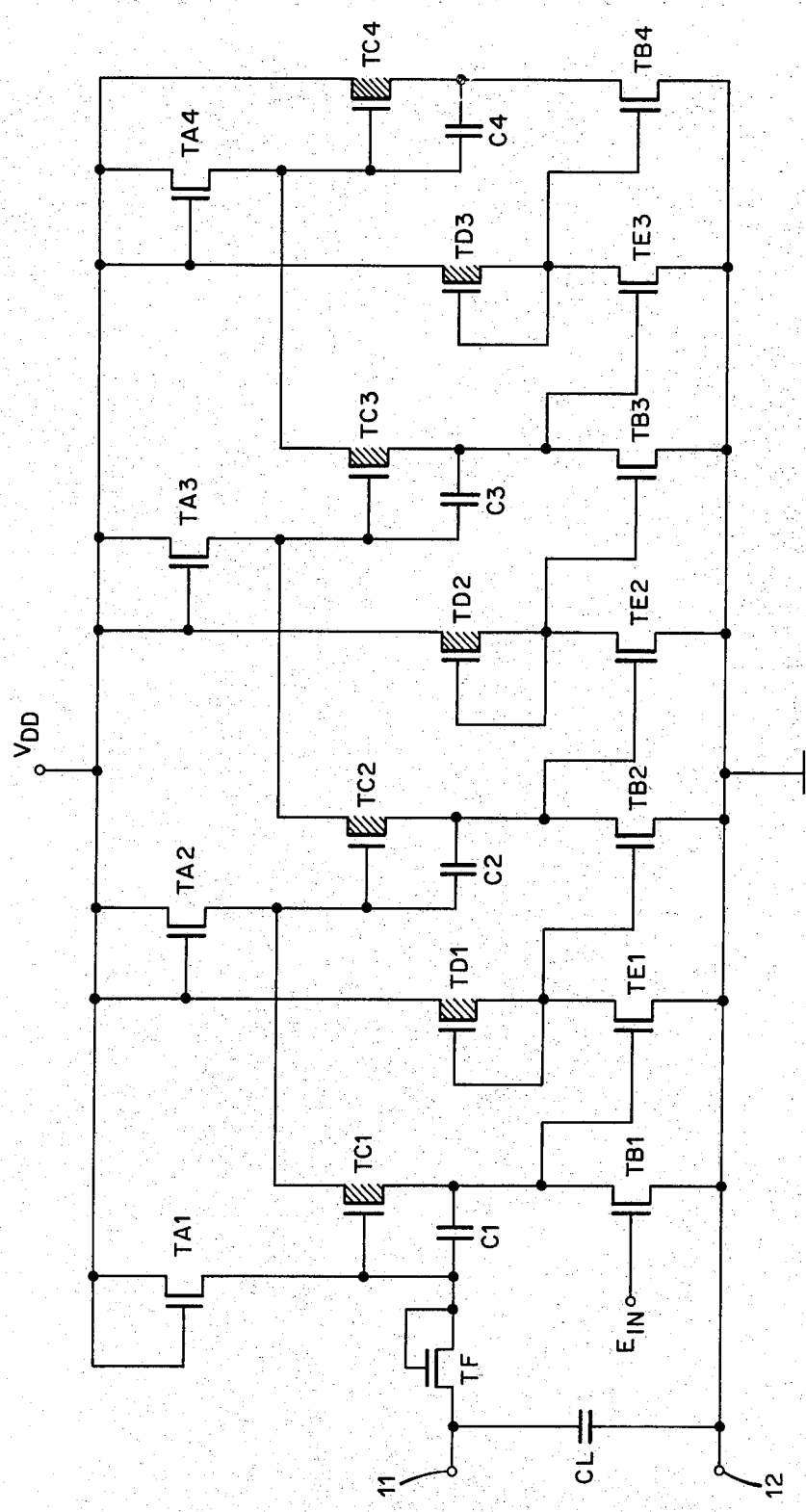
FIG. 1 is a schematic circuit diagram of an exemplary apparatus in accordance with the present invention.

FIG. 1 of the drawings illustrates an exemplary metal-oxide-silicon (MOS) field effect transistor (FET) apparatus in accordance with the present invention. In the circuit illustrated all of the FET's are N channel enhancement and depletion type devices. The FET devices and other components of the apparatus as illustrated in FIG. 1 may be fabricated as an integrated circuit in a single body of semiconductor material. The storage capacitor CL which is to be charged may be fabricated in the same body of semiconductor material or may be external of the body and connected to the circuit.

The apparatus for charging the storage capacitor CL includes a terminal $V_{DD}$ of a positive voltage source. The exemplary apparatus illustrated includes four stages. Each of the four stages has a capacitance C1–C4. A first enhancement type FET TA1–TA4 in each stage has one of its conduction path electrodes (source or drain) and its gate electrode connected to the voltage source $V_{DD}$ and its other conduction path electrode connected to the first terminal of the associated capacitance C1–C4. A second enhancement type FET TB1–TB4 in each stage has one conduction path electrode connected to the second terminal of the associated capacitance C1–C4 and the other conduction path electrode connected to ground. Each stage also has a third FET TC1–TC4 of the depletion type with its gate electrode connected to the juncture of the associated first FET TA1–TA4 and the first terminal of the associated capacitance C1–C4. One of the conduction path electrodes of the third FET TC1–TC4 of each stage is connected to the juncture of the second terminal of the associated capacitance C1–C4 and the associated second FET TB1–TB4. The other conduction path electrode of the third FET TC1–TC3 of each stage except the last is connected to the first terminal of the capacitance C2–C4 of the following stage. The other conduction path electrode of the third FET TC4 of the last stage is connected directly to the voltage source $V_{DD}$.

The gate electrode of the second FET TB1 of the first stage is connected to a control input terminal $E_{IN}$. The gate electrodes of the second FET's TB1–TB4 of the other stages are indirectly coupled to the control input terminal $E_{IN}$ by connections from the juncture of each of the second FET's TB1–TB3 and the second terminal of the associated capacitance C1–C3 except for the last stage by way of delay circuits. The delay circuit in each of the first three stages is an inverter circuit including an FET TD1–TD3 of the depletion type connected in series with an FET TE1–TE3 of the enhancement type between the voltage source $V_{DD}$ and ground. The juncture of the conductive path electrodes of the two transistors of each inverter circuit is connected to the gate electrode of the associated depletion type FET TD1–TD3 and to the gate electrode of the second FET TB2–TB4 of the following stage. The gate electrode of the enhancement type FET TE1–TE3 is connected to the juncture of the second FET TB1–TB3 and the second terminal of the capacitance C1–C3 of the preceding stage.

An FET TF of the enhancement type is connected in series between the first terminal of the capacitance C1 of the first stage and the first terminal of the storage capacitor CL. The gate electrode of FET TF is connected to the juncture of the FET TF and the capacitance C1 so that the FET TF functions as a unidirectional current flow device or diode. The storage capacitor CL is shown with its first terminal connected to a terminal 11 and its second terminal, which is connected to ground, connected to a second terminal 12. The charge stored in the storage capacitor CL is thus made available at terminals 11 and 12.

Figure 2A:
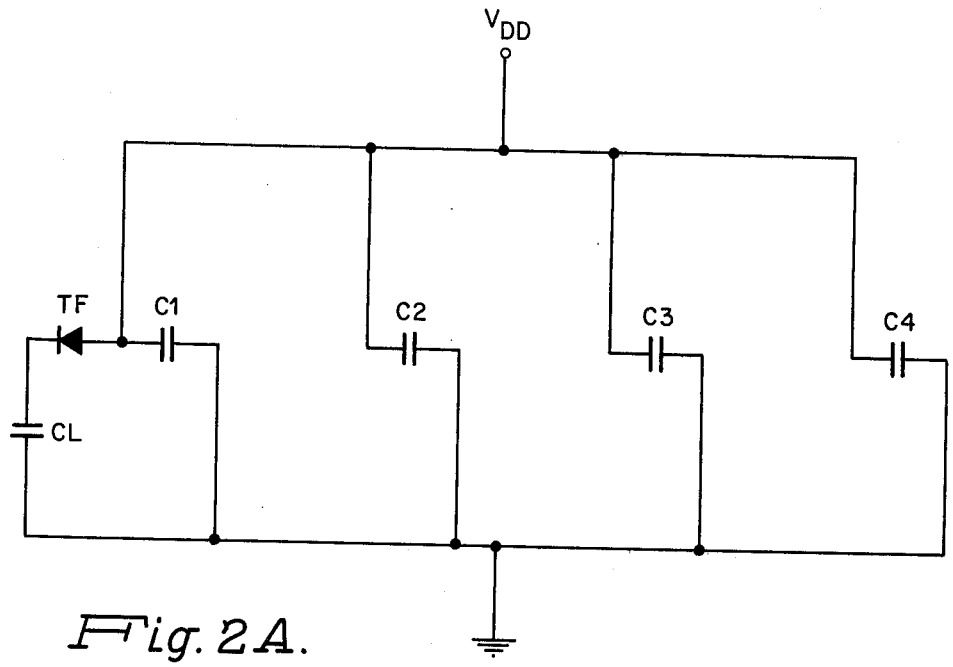
FIGS. 2A and 2B are diagrams illustrating equivalent circuits of the apparatus of FIG. 1 under two sets of operating conditions.

The apparatus illustrated in FIG. 1 operates in the following manner to store a charge in the storage capacitor CL. When the control signal $E_{IN}$ becomes high, all of the second FET's TB1–TB4 become conductive. The capacitances C1–C4 of each stage become charged by current flow through the associated first FET's TA1–TA4, which are highly conductive, and the second FET's TB1–TB4. At the same time the third FET's TC1–TC4 are in a relatively low conduction condition. Although there is some conduction through the third FET's TC1–TC4, there is no significant interference with charging of the capacitances C1–C4. FIG. 2A illustrates the equivalent of the circuit of FIG. 1 under these conditions. In effect, each of the capacitances C1–C4 is connected between the voltage source $V_{DD}$ and ground, and is charged to the supply voltage. The actual voltage across each capacitance C1–C4 is $V_{DD}-V_{th}-K_{sub}\sqrt{V_{SB}}$, where $V_{th}$ is the threshold voltage, $K_{sub}$ is the back bias constant, and $V_{SB}$ is the source to substrate voltage of each of the first FET's TA1–TA4.

When the control signal $E_{IN}$ becomes low, the second FET's TB1–TB4 are turned off. The action of the inverters of the FET's TD1–TD3 and TE1–TE3 in each stage except the fourth introduces a slight delay between each stage, thus insuring that the second FET of each stage is completely off before that of the following stage is turned off. This sequence of turning off the second FET's TB1–TB4 prevents the charge stored in a capacitance from leaking off through the second FET of the preceding stage.

Figure 2B:
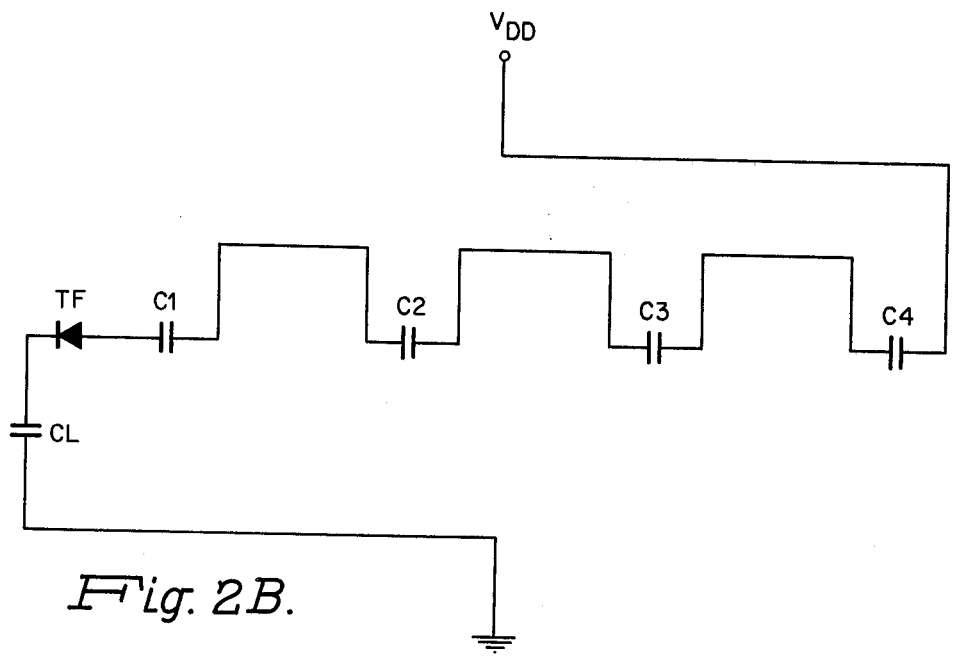

With the second FET's TB1–TB4 off, the voltages at the junctures of the second FET's TB1–TB4 and the third FET's TC1–TC4 increase, pulled up by conduction through the third FET's TC1–TC4. At the same time, the voltages at the gate electrode of the third FET's TC1–TC4 also rise because of the charges in the associated capacitances C1–C4. When the voltages at the gate electrodes of each of the third FET's TC1–TC4 exceeds $V_{DD}-V_{th}-K_{sub}\sqrt{V_{SB}}$ ($V_{th}$, $K_{sub}$, and $V_{SB}$ being parameters at the first FET's TA1–TA4), the first FET's TA1–TA4 become cut-off. The third FET's TC1–TC4 are in a relatively high conduction condition; and, therefore, in effect the capacitances C1–C4 are connected in series between the voltage source $V_{DD}$ and the storage capacitor CL as illustrated in the diagram of FIG. 2B. As the charges stored in the capacitances C1–C4 are partially transferred into the storage capacitor CL, the voltages across the capacitances C1–C4 decrease and the currents through them are reduced.

The voltage $V_{CL}$ produced across the storage capacitor CL by the transfer of charges from the capacitances C1–C4 may be calculated employing the law of conservation of charge as follows:

$$V_{CL} = \frac{N(V_{DD}-V_{TA}) + \frac{V_{DD}-V_{TF}}{N}}{CL + \frac{Cn}{N}} Cn$$

where Cn is the capacitance value of each capacitance C1–C4, N is the number of stages, $V_{TA}=V_{th}+K_{sub}\sqrt{V_{SB}}$ of each first FET TA1–TA4, and $V_{TF}=V_{th}+K_{sub}\sqrt{V_{SB}}$ of FET TF.

If the cycle of applying high and low control voltages $E_{IN}$ is repeated, the voltage across the storage capacitor CL is increased up to a maximum. During cycling the FET TF acts as a diode as illustrated in FIGS. 2A and 2B permitting current to flow into the storage capacitor CL from the apparatus and preventing the flow of current out of the storage capacitor CL into the apparatus when the control signal $E_{IN}$ is high. The final voltage which can be obtained across the storage capacitor CL may be expressed as $$V_{CL(final)}=N(V_{DD}-V_{TA})+V_{DD}-V_{TF}$$

For example, in an apparatus in accordance with the invention having a supply voltage $V_{DD}$ of 5 volts, $V_{TA}$ of 1.7 volts, $V_{TF}$ of 2.3 volts, four stages, a capacitive value Cn of 1 picofarad for each capacitance C1–C4 and a storage capacitor CL of 1 picofarad, after a single cycle the storage capacitor CL is charged to a voltage $V_{CL}$ of 11.1 volts. After a series of control input pulses, for example 5 volt squarewave pulses at a frequency of 500 KHz, the final voltage $V_{CL(final)}$ across the storage capacitor is 15.9 volts.

The foregoing are calculated values which do not take into consideration the effects of parasitic capacitances between both terminals of the capacitances C1–C4 and ground. One consequence of the parasitic capacitances is that the incremental increase of voltage $V_{CL}$ across the storage capacitor CL decreases with increasing number of stages. After a certain number of stages there is no further increase in the voltage $V_{CL}$. For example, in apparatus as described above, if the parasitic capacitance between each terminal of each capacitance C1–C4 is approximately 0.1 picofarads, more than four stages produces no significant result over that obtained with four stages.

In an exemplary apparatus as described above the dimensions of the channels of the FET's may be as follows: TA1–TA4 1.0 mil wide by 0.3 mil long; TB1–TB4 0.3 mil wide by 0.3 mil long; TC1–TC4 0.3 mil wide by 3.0 mils long; TD1–TD3 0.3 mil wide by 1.2 mils long; TE1–TE3 0.3 mil wide by 0.6 mil long; and TF 0.3 mil wide by 0.3 mil long.

While there has been shown and described what is considered a preferred embodiment of the present invention, it will be obvious to those skilled in the art that various changes and modifications may be made therein without departing from the invention as defined by the appended claims.

What is claimed is:
1. Apparatus for charging a storage capacitor including
a source of operating potential;
a point of reference potential;

a plurality of stages arranged in order, each stage including capacitance means having first and second terminals, a first field effect transistor connected between the source of operating potential and the first terminal of the capacitance means, and a second field effect transistor connected between the second terminal of the capacitance means and the point of reference potential;

each of said stages except the last stage including a third field effect transistor connected between the second terminal of the capacitance means of the associated stage and the first terminal of the capacitance means of the following stage;

the last stage having a third field effect transistor connected between the second terminal of the capacitance means of the last stage and the source of operating potential;

means for coupling the first terminal of the capacitance means of the first stage to one terminal of the storage capacitor;

means for coupling the point of reference potential to the other terminal of the storage capacitor;

control means for applying first or second control signal conditions to said stages;

said first and second field effect transistors being operable in a high conduction condition and said third field effect transistors being operable in a relatively low conduction condition in response to said first control signal condition at said control means whereby each of said capacitance means is connected between said source of operating potential and said point of reference potential and becomes charged;

said first and second field effect transistors being operable in a low conduction condition and said third field effect transistors being operable in a relatively high conduction condition in response to said second control signal condition at said control means whereby the plurality of capacitance means are connected in series between said source of operating potential and said storage capacitor transferring a portion of the charges in the capacitance means into the storage capacitor;

said control means including a control input terminal connected to the gate electrode of the second field effect transistor of the first stage for receiving said first or second control signal conditions, and means coupling the gate electrode of the second field effect transistor of each of said stages except the first stage to the preceding stage.

2. Apparatus for charging a storage capacitor in accordance with claim 1 wherein the gate electrode of each of said first field effect transistors is connected to the source of operating potential; and the gate electrode of each of said third field effect transistors is connected to the juncture of the first terminal of the capacitance means and the first field effect transistor of the associated stage.

3. Apparatus for charging a storage capacitor in accordance with claim 2 wherein each stage except the last stage includes a delay means connected between the juncture of the second terminal of the capacitance means and the second field effect transistor of the associated stage and the gate electrode of the second field effect transistor of the following stage.

4. Apparatus for charging a storage capacitor in accordance with claim 3 wherein each of said second field effect transistors is of the enhancement type.

5. Apparatus for charging a storage capacitor in accordance with claim 4 wherein each of said third field effect transistors is of the depletion type.

6. Apparatus for charging a storage capacitor in accordance with claim 5 wherein each of said first field effect transistors is of the enhancement type.

7. Apparatus for charging a storage capacitor in accordance with claim 6 wherein each of said delay means includes an inverter stage.

8. Apparatus for charging a storage capacitor in accordance with claim 7 wherein said means for coupling the first terminal of the capacitance means of the first stage to said one terminal of the storage capacitor includes a unidirectional current flow device for permitting the flow of current into the storage capacitor and for preventing the flow of current out of the storage capacitor.

9. Apparatus for charging a storage capacitor in accordance with claim 8 wherein each of said delay means includes a depletion type field effect transistor and an enhancement type field effect transistor connected in series between the source of operating potential and the point of reference potential;

the gate electrode of the depletion type field effect transistor being connected to the juncture of the depletion type field effect transistor and the enhancement type field effect transistor;

the gate electrode of the enhancement type field effect transistor being connected to the juncture of the second terminal of the capacitance means and the second field effect transistor of the associated stage; and the juncture of the depletion type field effect transistor and the enhancement type field effect transistor being connected to the gate electrode of the second field effect transistor of the following stage.

10. Apparatus for charging a storage capacitor in accordance with claim 9 wherein said field effect transistors are N channel metal-oxide-silicon field effect transistors.

* * * * *